United States Patent [19]

Vizziello et al.

[11] 3,841,367
[45] Oct. 15, 1974

[54] PLANING AND GROOVING MACHINE

[75] Inventors: Vito M. Vizziello, Hamden, Conn.;
Charles A. Bouteiller, Barrington, Mass.

[73] Assignee: New England Log Homes, Inc., New Haven, Conn.

[22] Filed: May 9, 1973

[21] Appl. No.: 358,690

[52] U.S. Cl.............. 144/3 R, 83/102.1, 83/156, 83/444, 144/39, 144/116, 144/134 R, 144/218, 144/230
[51] Int. Cl............................................ B27c 9/04
[58] Field of Search........... 144/230, 36, 37, 39, 41, 144/116, 117, 134 R, 136 R, 218; 83/102.1, 422, 156, 444

[56] References Cited
UNITED STATES PATENTS

| 1,825,041 | 9/1931 | Babare | 144/39 |
| 2,449,605 | 9/1948 | Kelton | 144/230 |
| 2,819,744 | 1/1958 | Chuet et al. | 144/116 K |
| 3,082,802 | 3/1963 | Dickson et al. | 144/116 X |
| 3,487,866 | 1/1970 | Mitten | 144/41 X |
| 3,678,974 | 7/1972 | O'Brien | 144/2 R |

Primary Examiner—Andrew R. Juhasz
Assistant Examiner—W. D. Bray
Attorney, Agent, or Firm—DeLio and Montgomery

[57] ABSTRACT

A machine for simultaneously planing and grooving a workpiece, comprising: a frame, at least one driven roll having planing blades thereon, and a plurality of feed rolls, wherein the driven roll has grooving blades positioned thereon coincident with each of the planing blades to cut a groove in the workpiece to a depth greater than the depth of the planing cut.

10 Claims, 5 Drawing Figures

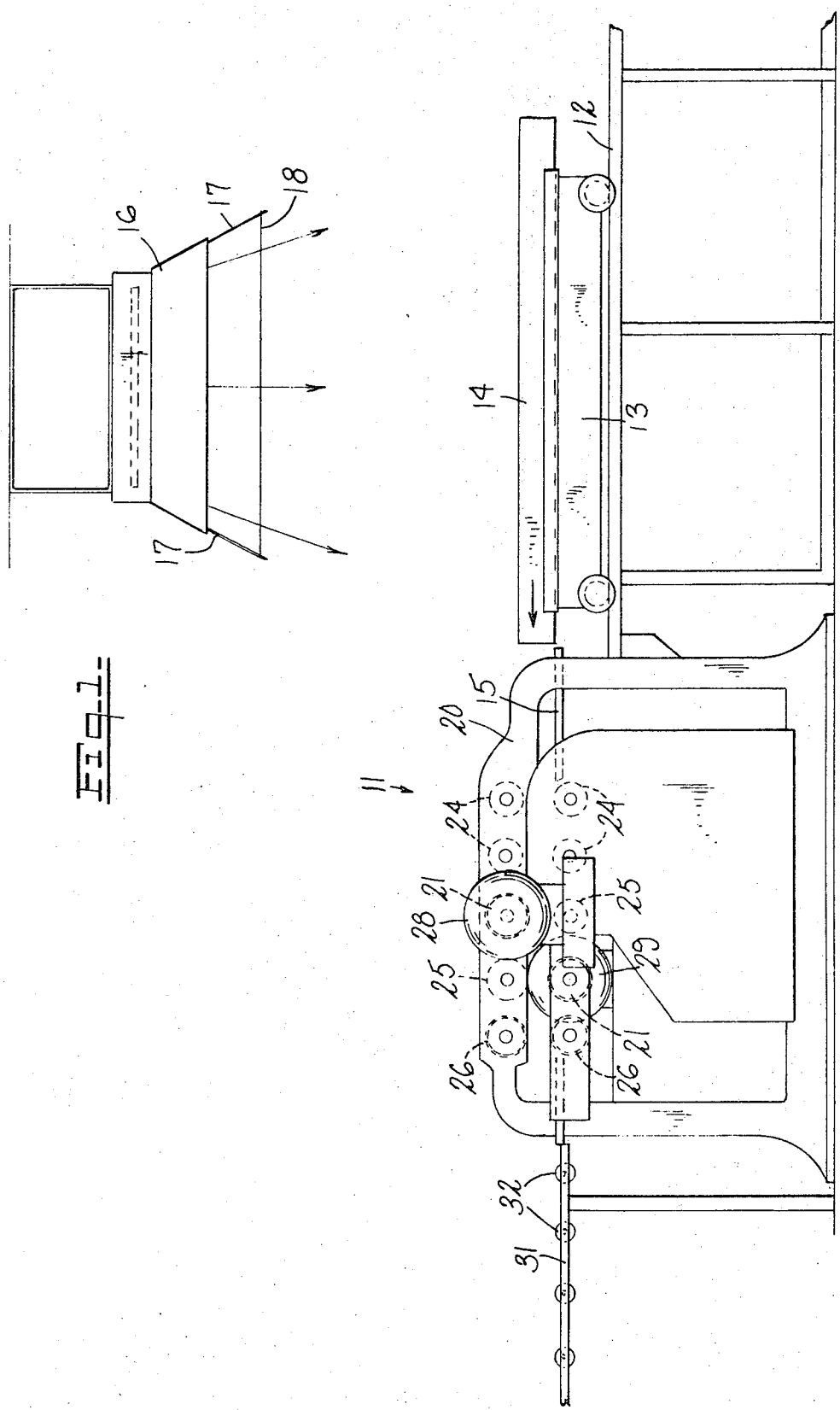

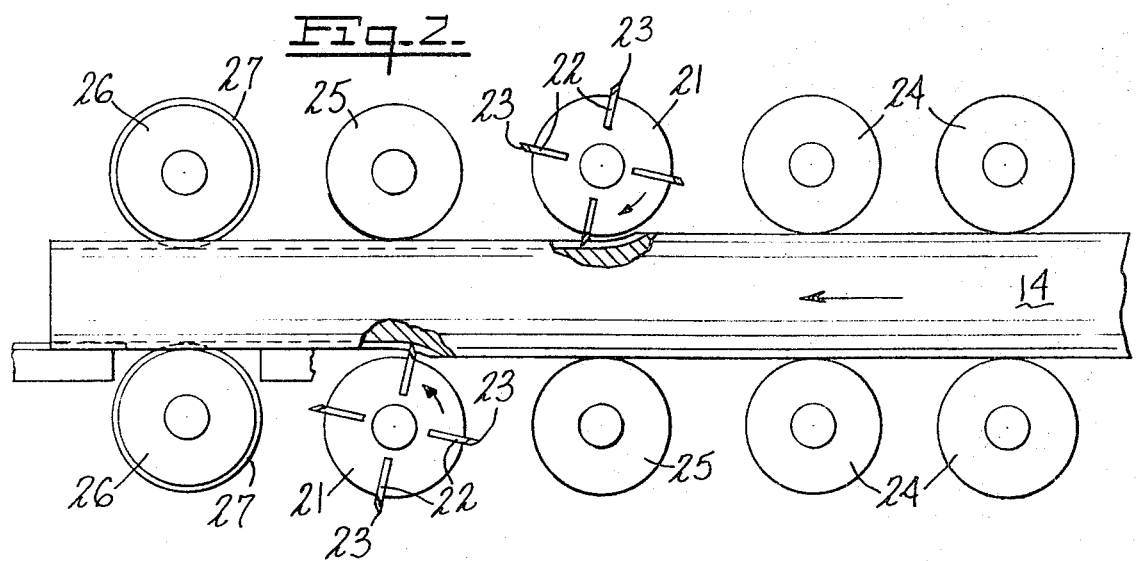
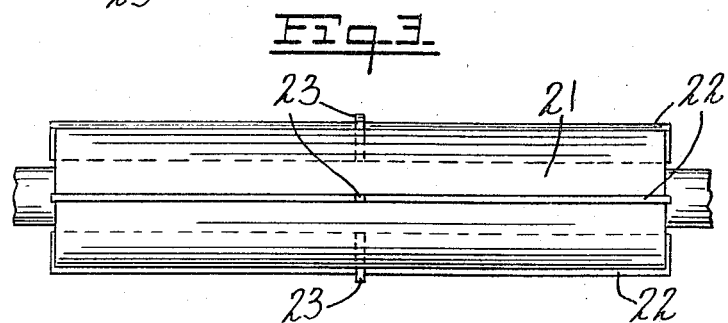
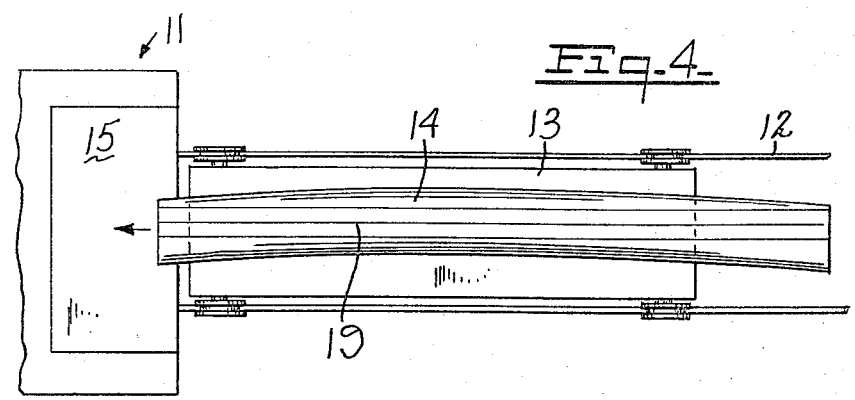
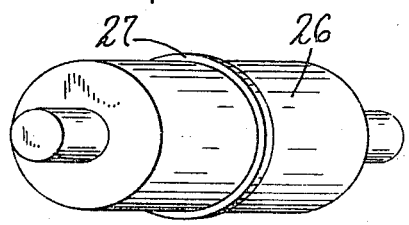

PLANING AND GROOVING MACHINE

BACKGROUND OF THE INVENTION

This invention relates to woodworking machines and in particular to improvements in planing machines whereby the machines are adapted for simultaneous planing and grooving of a workpiece.

Heavy duty woodworking machines, particularly for operation on a workpiece having considerable size and weight, such as structural beams, are massive and expensive, often weighing several tons and costing thousands of dollars. From the standpoint of efficiency and economy of operation, including the saving of space in a woodworking plant, the ability of a machine to perform multiple operations is a significant contribution. Although it may be possible to position different woodworking machines adjacent one another to facilitate transfer of a workpiece from one machine to the next, the saving of space by this approach does not materially offset the still substantial cost of separate machines for different woodworking operations. For example, it does not significantly reduce the overall cost of planing a beam and then cutting a groove in the planed portion, merely to position a grooving machine adjacent a planing machine so that the workpiece after being planed can be passed through the grooving machine.

Precision planing and grooving of a workpiece is required in many woodworking operations. One of these is the preparation of logs used in the construction of log buildings. In this industry it has become common practice to plane two opposing sides of a hand peeled log parallel so that when the logs are stacked one on the other to form a wall of a building, the wall will retain the rounded appearance of the log both inside and outside the building. In addition to spiking the logs together, the planed sides of the logs are longitudinally grooved to receive a spline. The spline extends vertically into the grooves of adjacent logs to form a weather-tight joint. Auxiliary materials often are used with the spline, such as gasketing material, and the spline itself may be of a material which promotes a weather-tight joint. It will be evident that the ability to simultaneously plane and groove such beams or logs with a single machine will greatly contribute to the efficiency and economy of the manufacturing process.

OBJECTS AND SUMMARY

Accordingly, an object of the invention is to provide a new and improved woodworking machine capable of simultaneous planing and grooving of a workpiece.

Another object is to provide a new and improved woodworking machine and associated apparatus, capable of simultaneous and precision planing and grooving of a workpiece.

These and other objects, features and advantages of the invention will be apparent from the specification which follows.

In summary outline, the machine comprises a frame, at least one driven roll having planing blades thereon, and a plurality of feed rolls, wherein a grooving blade is positioned on the driven roll to cut a groove in a workpiece to a depth greater than the depth of the planing cut. The machine may be a totally new machine or a known planing machine modified in accordance with the invention for simultaneous planing and grooving. Furthermore, a machine of the invention may simultaneously plane and groove only a single surface or, in a preferred embodiment, the machine may simtulaneously plane and groove opposing surface of a workpiece.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is had to the following description taken in conjunction with the accompanying drawings, in which:

FIG. 1 is a partly diagrammatic, side view of apparatus including a machine of the invention;

FIG. 2 is a partly diagrammatic, detailed side view of portions of a machine of the invention;

FIG. 3 is a partly diagrammatic elevation of a component of the machine illustrated in FIG. 2, viewed from the left side of FIG. 2;

FIG. 4 is a top plan view of a portion of apparatus including a machine of the invention illustrating a method of operation; and FIG. 5 is a perspective view of another component of the machine illustrated in FIGS. 1 and 2.

With respect to FIG. 1, there is shown a planing and grooving machine 11 of the invention in conjunction with associated apparatus. The associated apparatus includes a feed table 12 with tracks thereon to receive a wheeled member 13. The wheeled member 13 or "dolly" cradles a peeled log 14 which is to be planed and grooved, thereby facilitating alignment of the log for entry onto a feed bed 15 of the machine 11.

Positioned overhead of feed table 12 is a shaded lamp 16 from which is supported by depending brackets 17 a wire 18. The lamp and wire are oriented to cast a shadow 19 of the wire onto the feed table 12 and wheeled member 13 in alignment with the cutting edges of the blades of machine 11. The shadow 19 therefore will be cast on the upper surface of log 14 when the log is fed to the blades of the machine, with the result that the log can be aligned on the feed table 12 prior to cutting, independently of the curvature of the log, as best shown in FIG. 4. Accordingly, the shadow 19 will help to exclude logs which are curved too greatly on one side or the other for planing and grooving along the desired length. The alignment apparatus, including the lamp 16, the bracket 17 and the wire 18, and its use for aligning logs in woodworking operations are known, and the apparatus is commercially available.

The frame 20 of the machine 11 may have any size and shape suitable for supporting at least one driven roller 21 at a convenient height. The driven roller 21 is provided on its periphery with planing cutter heads 22, preferably spaced equidistantly. While one such planing blade 22 might be suitable for some operations, a plurality of such blades is preferred, as shown. Such machines together with associated components such as electric motor drives, feed bed adjusting means and feed rate controls, are known as "single surface planers" and are commercially available. When it is desired to plane opposing surfaces of a beam or log 14, a planing machine is utilized which has a second driven roller 21 having planing blades 22 thereon, as illustrated in FIGS. 1 and 2. Such machines also are commercially available and are known as "double planers".

In accordance with the invention, a single surface planer or a double planer may be modified, as best shown in FIGS. 2 and 3, to include one or more grooving teeth or blades 23 on the periphery of the driven rolls 21. Preferably, a plurality of grooving blades 23 are mounted on each driven roll 21. The grooving blades are positioned intermediate the ends of the planing cutter heads 22 to facilitate cutting a groove approximately along the center of a planing cut. The grooving blades 23 project above the planing cutter heads 22 so as to cut a groove in the workpiece to a depth greater than the depth of the planing cut. The width of the blades 23 may be selected for any desired width of a groove to be cut. It will thus be seen that as the driven rollers 21 rotate in the direction of the arrows in FIG. 2, the log 14 is pulled between the rolls and the opposing surfaces of the log are simultaneously planed and grooved.

The log 14 or other workpiece is aligned in the machine 11 for planing and grooving by a plurality of feed rolls, usually including two pairs of driven infeed rolls 24, a pair of backup idler outfeed rolls 25, and a pair of driven outfeed rolls 26. However, one or more of the outfeed rolls 26 are modified to provide an annular flange 27 on the periphery of each roll. The flange 27 preferably is positioned intermediate the ends of the rolls 26. The annular flanges 27 are dimensioned to mate with the grooves which have been made in the log 14 by the grooving blades 23, thus guiding the log 14 from the blades and helping to provide accurate grooving.

The various rolls, including the driven rolls 21, may be positioned for maximum alignment and control during the cutting operation. Such an arrangement is illustrated in FIGS. 1 and 2, where pairs of rolls 24, 25 and 26 are shown spaced apart on parallel axes above and below the log 14.

Various other components known in the art, although not shown in FIGS. 1–5, may be incorporated. These include one or more motors for driving the driven rolls, and various types of gearing systems including pulleys, drive shafts, belts, counter shafts and the like. Still further, various control means for elevating or lowering the components of the machine and associated apparatus may be employed to accommodate workpieces of different sizes and shapes. For example, as illustrated in FIG. 1, the machine may include a pair of electric motors 28 and 29 for driving the rolls 21. An exit table 31 having a series of idler rollers 32, as also shown in FIG. 1, may be utilized to facilitate removal of the workpiece after the woodworking operation.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. In a machine for planing a workpiece, said machine including a frame, at least one driven roll having at least one planing blade thereon, and a plurality of feed rolls, the improvement which comprises a grooving blade positioned on said driven roll coincident with said planing blade to cut a groove in said workpiece to a depth greater than the depth of the planing cut, whereby said machine is adapted for simultaneous planing and grooving of said workpiece.

2. A machine as in claim 1 including a pair of said driven rolls each having a plurality of said planing and grooving blades thereon, said driven rolls being spaced apart on parallel axes so as to plane and groove opposing sides of a workpiece passing between said rolls.

3. A machine as in claim 2 wherein said grooving blades are positioned on said rolls intermediate the ends of said planing blades.

4. A machine as in claim 1 including a feed bed, and wherein said feed rolls include a plurality of outfeed rolls adjacent the exit from said feed bed.

5. A machine as in claim 4 wherein at least one of said outfeed rolls has an annular flange adapted to mate with the groove cut in a workpiece passing through said machine, whereby the alignment of said workpiece in said machine is maintained.

6. A machine as in claim 2 wherein said grooving blades are positioned on said driven rolls intermediate the ends of said planing blades, said feed rolls including a plurality of outfeed rolls, said feed rolls being spaced apart on parallel axes so as to guide a workpiece passing through said machine, a first one of said outfeed rolls being positioned for contact with the upper surface of said workpiece and a second one of said outfeed rolls being positioned for contact with the lower surface of said workpiece, said first and second outfeed rolls each having an annular flange adapted to mate with the grooves cut in said workpiece whereby the alignment of said workpiece in said machine is maintained.

7. A machine as in claim 6 wherein said flanged outfeed rolls are driven rolls.

8. The combination of a machine as in claim 1 and feed table apparatus, said feed table apparatus including a feed table having tracks therein, and a wheeled member on said tracks for supporting and aligning said workpiece.

9. A machine as in claim 4 wherein said feed rolls include a plurality of infeed rolls adjacent the entry to said feed bed.

10. A machine as in claim 6 wherein said feed rolls include a plurality of infeed rolls adjacent the entry to said feed bed.

* * * * *